United States Patent
Kim et al.

(10) Patent No.: US 8,184,220 B2
(45) Date of Patent: May 22, 2012

(54) LIQUID CRYSTAL DISPLAY, THIN FILM TRANSISTOR SUBSTRATE AND METHOD THEREOF

(75) Inventors: Jang-Il Kim, Asan-si (KR); Hyun Park, Cheonan-si (KR); You-Hyun Jeong, Cheonan-si (KR); Seung-Suk Yang, Cheonan-si (KR); Jeong-Eun Park, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 547 days.

(21) Appl. No.: 12/163,200

(22) Filed: Jun. 27, 2008

(65) Prior Publication Data
US 2009/0244424 A1 Oct. 1, 2009

(30) Foreign Application Priority Data
Mar. 25, 2008 (KR) ........................ 10-2008-0027419

(51) Int. Cl.
*G02F 1/1343* (2006.01)
*G02F 1/136* (2006.01)
(52) U.S. Cl. .............................. 349/38; 349/48; 349/139
(58) Field of Classification Search .................... 349/38, 349/48, 139
See application file for complete search history.

(56) References Cited

U.S. PATENT DOCUMENTS

| 7,098,983 | B2 | 8/2006 | Yee et al. | |
|---|---|---|---|---|
| 2005/0156857 | A1* | 7/2005 | Lee et al. | 345/100 |
| 2006/0227274 | A1* | 10/2006 | Do et al. | 349/139 |
| 2006/0238668 | A1* | 10/2006 | Yee et al. | 349/43 |
| 2007/0052897 | A1* | 3/2007 | Kim et al. | 349/139 |

FOREIGN PATENT DOCUMENTS

| CN | 101109880 A | 1/2008 |
|---|---|---|
| JP | 2002-287163 | 10/2002 |
| KR | 1020040059687 | 7/2004 |
| KR | 1020070082240 | 8/2007 |

* cited by examiner

*Primary Examiner* — Mark Robinson
*Assistant Examiner* — Jerry Blevins
(74) *Attorney, Agent, or Firm* — Innovation Counsel LLP

(57) ABSTRACT

A liquid crystal display ("LCD") capable of improving display quality includes a first insulating substrate, gate wiring lines formed on the first insulating substrate and extending in a first direction, pixel electrodes, each of which includes first and second sub-pixel electrodes that are, respectively, applied with different data voltages from first and second wiring lines insulated from and crossing the gate wiring lines, extending in a second direction and an insulting layer interposed between the first data wiring line and the second data wiring line overlapped by the first data wiring line. Therefore, an aperture ratio of the LCD increase because the first data wiring line overlapped the second data wiring line have less area between pixel electrodes. A display quality of the LCD improves.

15 Claims, 8 Drawing Sheets

LIQUID CRYSTAL DISPLAY, THIN FILM TRANSISTOR SUBSTRATE AND METHOD THEREOF

This application claims priority to Korean Patent Application No. 10-2008-0027419, filed on Mar. 25, 2008, and all the benefits accruing therefrom under 35 U.S.C. §119, and the contents of which in their entireties are herein incorporated by reference.

BACKGROUND OF THE INVENTION

1. Field of the Invention

The present invention relates to a thin film transistor (TFT) substrate, a liquid crystal display ("LCD") and method thereof, and more particularly, to an LCD having improved display quality, and a method of improving display quality of the LCD.

2. Description of the Related Art

Liquid crystal displays ("LCDs") are now widely used as one type of flat panel display. An LCD includes two display panels, on which field generating electrodes, such as pixel electrodes and common electrodes, are formed with a liquid crystal layer interposed between the panels. In the LCDs, a voltage is applied to the field generating electrodes so as to generate an electric field in the liquid crystal layer, and the alignment of liquid crystal molecules of the liquid crystal layer is determined by the electric field. Then, the polarization of incident light is controlled, thereby performing image display.

Among the LCDs, an LCD of a vertically aligned ("VA") mode has been considered because it has a large contrast ratio and a wide reference viewing angle, in which the main directors of liquid crystal molecules are perpendicular to the upper and lower display panels in a state where an electric field is not applied. However, the VA mode LCD has a problem in that side visibility is lower compared with front visibility. In order to solve this problem, there has been suggested a method that divides one pixel into a pair of sub-pixels, forms switching elements in the individual sub-pixels, and applies different voltages to the sub-pixels.

However, in such an LCD according to the related art, since the movement of liquid crystal located above data lines cannot be accurately controlled due to an electric field between the pixel electrodes, light leakage occurs, which results in deterioration in display characteristics of the LCD.

Further, in the LCD having the above-described structure, when coupling capacitances between the sub-pixel electrode, to which a relatively higher data voltage is applied, and a pair of data lines located on both sides of the sub-pixel are inconsistent, display characteristics deteriorate.

BRIEF SUMMARY OF THE INVENTION

The present invention provides a liquid crystal display ("LCD") capable of improving display quality. The display quality may be improved by increasing an aperture ratio of the LCD since the first data wiring line overlaps the second data wiring line leaving less area between pixel electrodes.

The present invention also provides a method of improving the display quality of the LCD.

According to exemplary embodiments of the present invention, an LCD includes a first insulating substrate, gate wiring lines formed on the first insulating substrate and extending in a first direction, data wiring lines insulated from and crossing the gate wiring lines, and the data wiring lines extending in a second direction, and pixel electrodes, each of which includes first and second sub-pixel electrodes, to which different data voltages are applied from the data wiring lines, respectively, in which at least a part of the first wiring line overlaps the second wiring line.

According to other exemplary embodiments of the present invention, a thin film transistor (TFT) substrate includes a gate wiring line and a data wiring line insulated from and crossing each other on an insulating substrate, a pair of first and second thin film transistors ("TFTs") connected to the gate wiring line and the data wiring line, a first sub-pixel electrode connected to the first TFT, a second sub-pixel electrode surrounding the first sub-pixel electrode, separated from the first sub-pixel electrode by a gap, and connected to the second TFT, a first storage line overlapping the first sub-pixel electrode and receiving a first storage voltage, and a second storage line overlapping the second sub-pixel electrode and receiving a second storage voltage different from the first storage voltage. Wherein, at least a part of the first wiring line overlaps the second wiring line.

According to yet other exemplary embodiments of the present invention, a method of improving display quality of an LCD having a matrix of pixel regions, includes forming gate wiring lines on an insulating substrate, the gate wiring lines extending substantially in a first direction, forming first and second data wiring lines insulated from the gate wiring lines, the data wiring lines extending substantially in a second direction, the second direction substantially perpendicular to the first direction and at least a part of the first wiring line overlaps the second wiring line, forming first and second sub-pixel electrodes within each pixel region, the first sub-pixel electrode connected to the first data wiring line and the second sub-pixel electrode separated from the first sub-pixel electrode by a gap, and connected to the second data wiring line, and forming a storage line overlapping at least one of the first and second sub-pixel electrode and receiving a first storage voltage.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
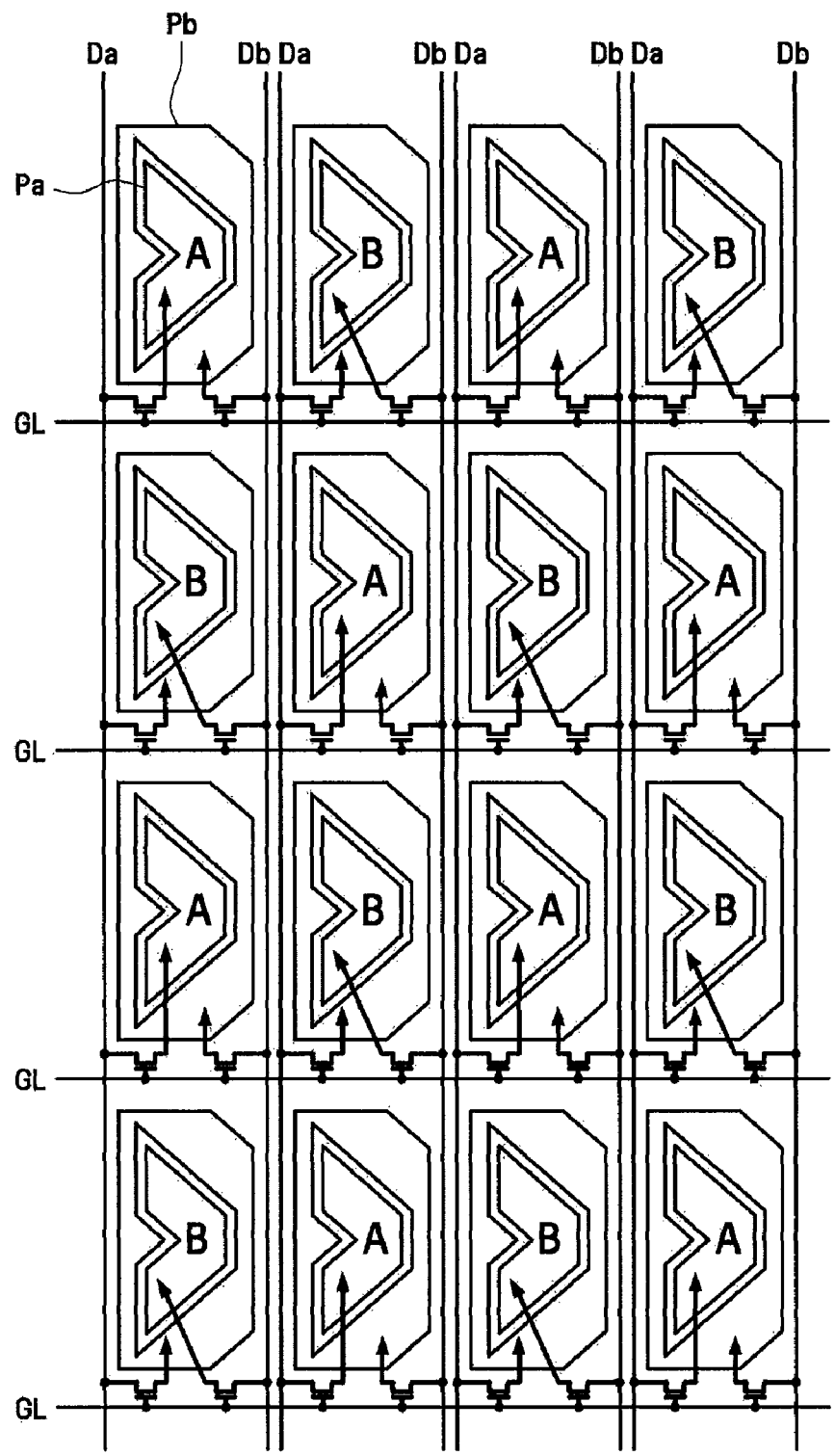
FIG. 1 is a schematic view illustrating an exemplary pixel array of an exemplary liquid crystal display ("LCD") according to an exemplary embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. The size of each layer or each region may be exaggerated in the drawings for the purpose of a clear description.

It will be understood that when an element or a layer is referred to as being "on" another element or layer, it can be directly on the other element or intervening elements may also be present. In contrast, when an element is referred to as being "directly on" another element, there are no intervening elements present. Like reference numerals refer to like elements throughout the specification. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The terminologies, such as below, beneath, lower, above, upper, and the like, may be used to easily describe one element, components, other elements, or a positional relationship between components shown in drawings. It should be understood that the terminologies further mean other directions of elements during the usage and operation as well as the direction shown in the drawings.

Preferred embodiments of the invention will be described below with reference to plan views and cross-sectional views, which are exemplary drawings of the invention. The exemplary drawings may be modified by manufacturing techniques and/or tolerances. Accordingly, the preferred embodiments of the invention are not limited to specific configurations shown in the drawings, and include modifications based on manufacturing processes. Therefore, regions shown in the drawings have schematic characteristics. In addition, the shapes of the regions shown in the drawings exemplify specific shapes of regions in an element, and do not limit the invention.

Hereinafter, a liquid crystal display ("LCD") according to exemplary embodiments of the present invention will be described in detail with reference to the accompanying drawings.

Figure 2:
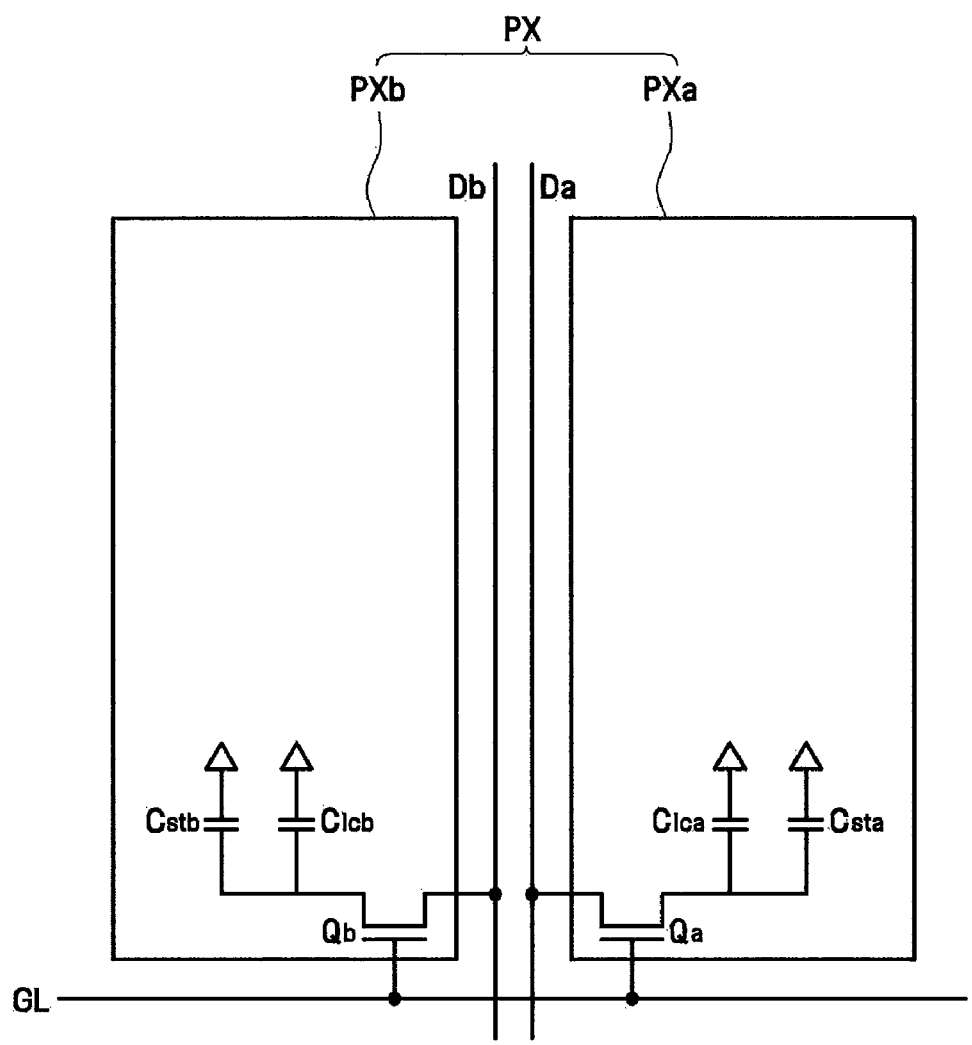
FIG. 2 is an equivalent circuit diagram of one exemplary pixel in the exemplary LCD of FIG. 1.

FIG. 1 is a schematic view illustrating an exemplary pixel array of an exemplary liquid crystal display ("LCD") according to an exemplary embodiment of the present invention. FIG. 2 is an equivalent circuit diagram of one exemplary pixel in the exemplary LCD of FIG. 1

The LCD of FIGS. 1 and 2 includes a liquid crystal panel assembly (not shown), a gate driver (not shown) and a data driver (not shown) that are connected to the liquid crystal panel assembly, a gray voltage generator (not shown) that is connected to the data driver, and a signal controller (not shown) that controls them.

The liquid crystal panel assembly includes a plurality of display signal lines, and a plurality of pixels PX that are connected to the display signal lines and substantially arranged in a matrix shape. Here, the liquid crystal panel assembly includes a lower display panel (not shown) and an upper display panel (not shown) that face each other, and a liquid crystal layer (not shown) that is interposed between the lower and upper display panels.

Figure 3A:
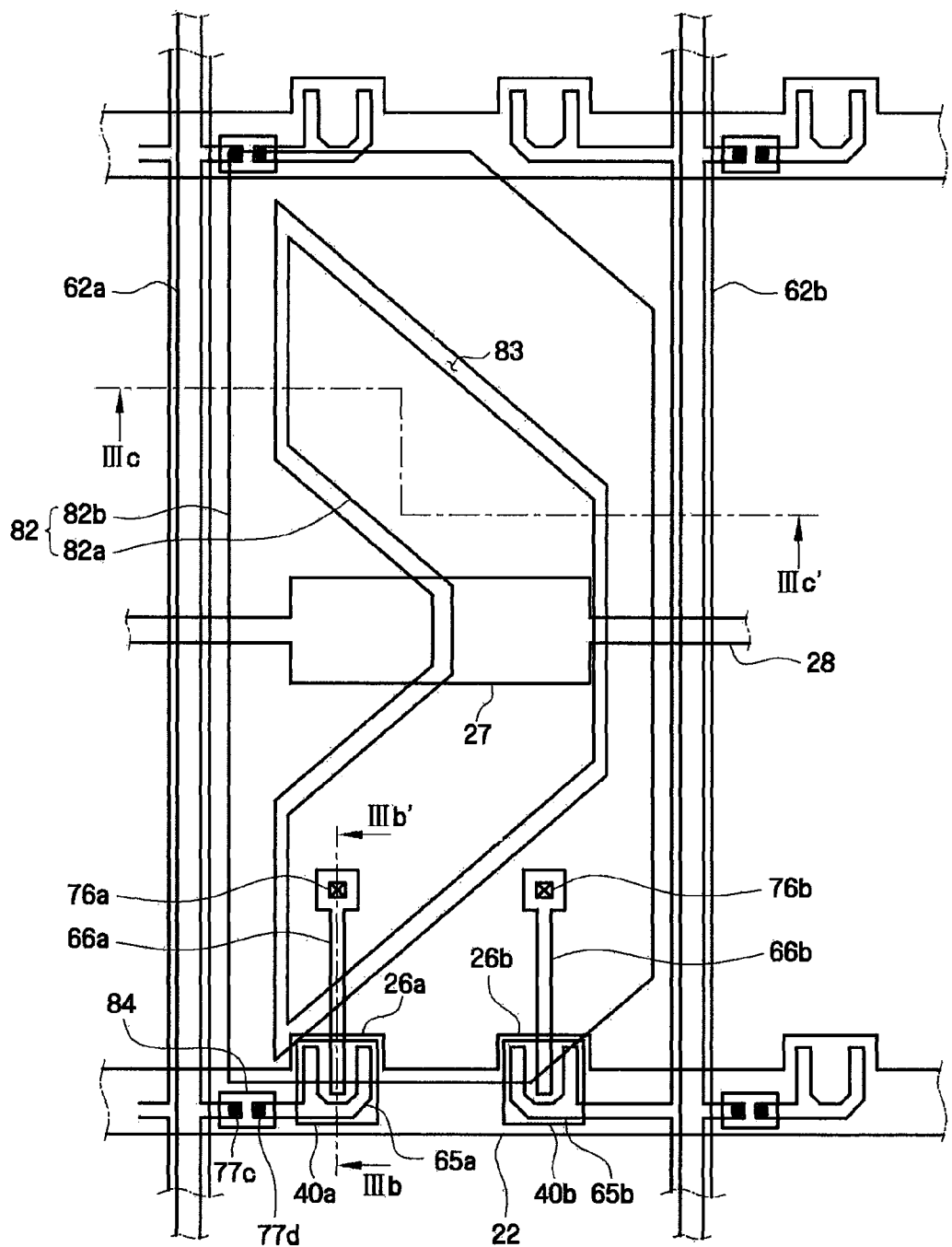
FIG. 3A is a layout view of an exemplary lower display panel that includes an exemplary A-type pixel of FIG. 1 according to the exemplary embodiment of the present invention.

Referring to FIGS. 1, 2 and 3A, the display signal lines are provided on the lower display panel, and include a plurality of gate lines G that transmit gate signals and data lines Da and Db that transmit data signals. The gate lines GL substantially extend in a first direction, parallel with one another. The data lines Da and Db substantially extend in second column direction. In some embodiments of the invention the first direction is substantially perpendicular to the second direction.

Each of the pixels PX includes a pair of sub-pixels PXa and PXb. The sub-pixels PXa and PXb respectively include switching elements Qa and Qb that are connected to corresponding data lines Da and Db and one gate line GL, liquid crystal capacitors Clca and Clcb that are connected to the switching elements Qa and Qb, respectively, and a pair of storage capacitors Csta and Cstb that are connected to the liquid crystal capacitors Clca and Clcb, respectively. That is, the two data lines Da and Db and the one gate line GL are allocated to a pair of sub-pixels PXa and PXb. In alternative embodiments, the storage capacitors Csta and Cstb may be omitted.

The switching elements Qa and Qb of the respective sub-pixels PXa and PXb have thin film transistors ("TFTs") that are provided on the lower display panel. Each of the switching elements Qa and Qb is a three-terminal element that includes a control terminal (hereinafter, referred to as "gate electrode"), which is connected to the gate line GL applied with a gate signal, an input terminal (hereinafter, referred to as "source electrode"), which is connected to each of the respective data lines Da and Db, and an output terminal (hereinafter, referred to as a "drain electrode"), which is connected to each of the respective liquid crystal capacitors Clca and Clcb and each of the respective storage capacitors Csta and Cstb.

Each of the liquid crystal capacitors Clca and Clcb has two terminals, which include the sub-pixel electrode Pxa, Pxb of the lower display panel and a common electrode of the upper display panel, and the liquid crystal layer interposed between the sub-pixel electrode Pxa, Pxb and the common electrode (not shown) functions as a dielectric. The sub-pixel electrodes Pxa and Pxb are connected to the switching elements Qa and Qb, respectively. The common electrode is formed on the entire surface, or substantially the entire surface, of the upper display panel and is applied with a common voltage Vcom. Alternatively, the common electrode may be provided on the lower display panel. In this case, at least the pixel electrode or the common electrode may be formed in a linear or a bar shape.

Meanwhile, in order to have a color display, each pixel PX uniquely displays one of a set of main colors (spatial division) or each pixel PX temporally and alternately displays the set of main colors (temporal division). Then, the primary colors are spatially and temporally synthesized, and thus a desired color is recognized. Examples of the main colors include three colors of red, green, and blue. As an example for the spatial division, each pixel PX may have a color filter that represents one of the colors in a region of the upper display panel. Further, the color filter may be formed above or below the sub-pixel electrode Pxa, Pxb of the lower display panel.

Figure 6:
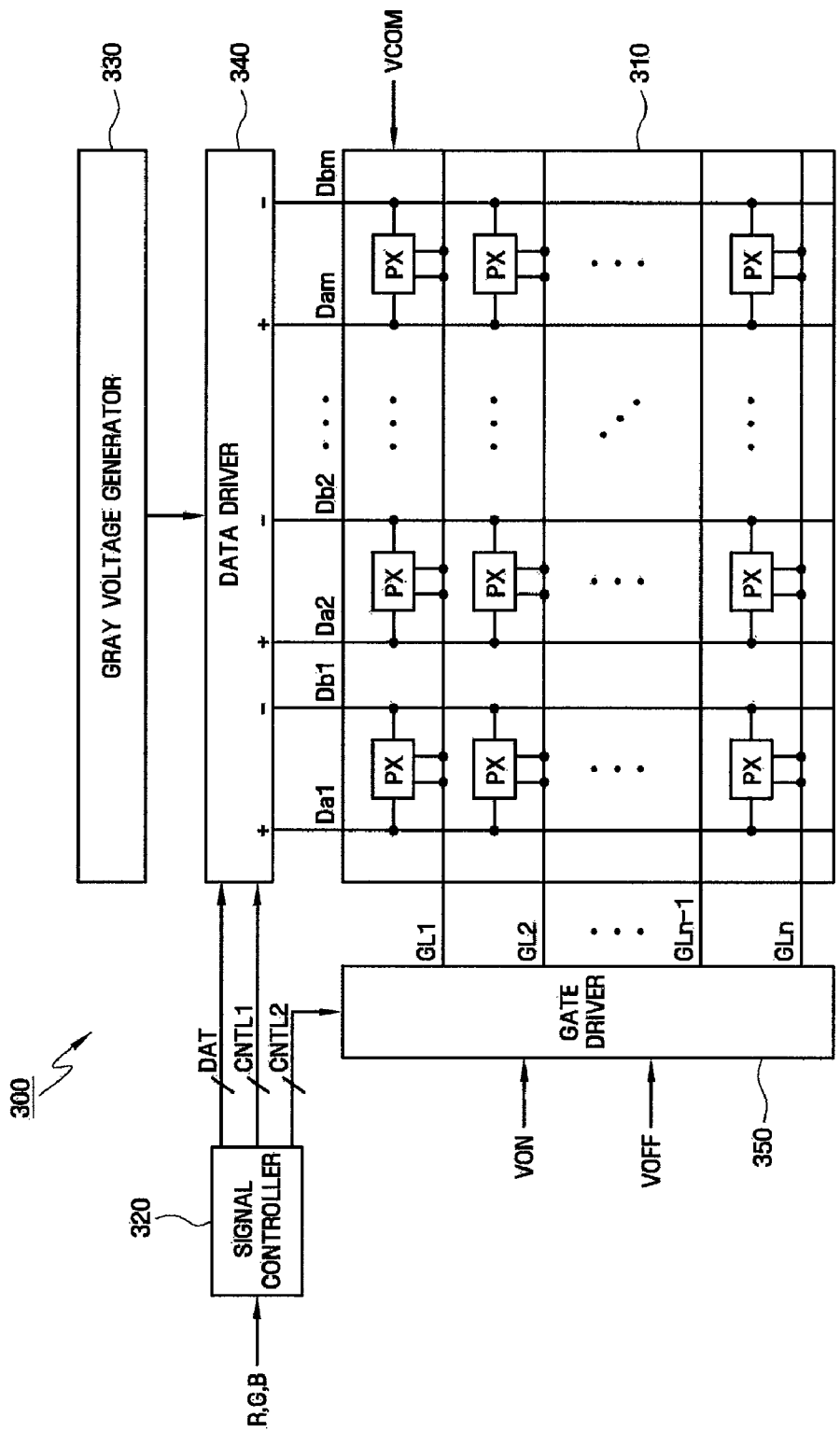
FIG. 6 is a block diagram illustrating an exemplary LCD, to which an exemplary lower display panel shown in FIG. 1 is applied.

The gate driver, as will be further described below with respect to FIG. 6, is connected to the gate lines GL, and applies, to the gate lines GL, the gate signals that are obtained by combining a gate on voltage Von and a gate off voltage Voff from the outside.

The gray voltage generator may generate two sets of gray voltages (or a set of reference gray voltages) related to transmittance of the pixels and provide the generated sets of gray voltages to the data driver. That is, the two sets of gray voltages may be independently provided to a pair of sub-pixels PXa, PXb forming a pixel PX. However, the present invention is not limited thereto. For example, instead of the two sets of gray voltages, one set of gray voltages may be generated.

The data driver is connected to pairs of data lines Da and Db. The data driver transmits a data voltage to one of the pair of sub-pixels, which form a pixel, through the data line Da, and a different data voltage to the other sub-pixel of the pair of sub-pixels, which form a pixel, through the data line Db.

The gate driver or the data driver may be directly mounted on the liquid crystal panel assembly as a plurality of driving integrated circuit ("IC") chips or may be attached to the liquid crystal panel assembly while being mounted on a flexible printed circuit film (not shown) by a tape carrier package ("TCP"). Alternatively, the gate driver or the data driver may be integrated into the liquid crystal panel assembly together with the display signal lines GL, Da, and Db, the TFT switching elements Qa and Qb, and the like.

The timing controller controls the operation of the gate driver, the data driver, and the like.

Returning to FIG. 1, one pixel includes two switching elements Qa, Qb, and the sub-pixel electrodes Pa and Pb that are connected to the switching elements Qa, Qb, respectively. Here, it is assumed that a relatively higher data voltage is applied to the first sub-pixel electrode Pa, and a relatively lower data voltage is applied to the second sub-pixel electrode Pb. Hereinafter, the low and high data voltages mean low and high differences between the common voltage and the data voltage. Further, a pixel that has the first sub-pixel electrode Pa applied with a data voltage through the first data line Da is referred to as an A-type pixel. A pixel that has a first sub-pixel electrode Pa applied with a data voltage through the second data line Db is referred to as a B-type pixel.

As shown in FIG. 1, the A-type pixels and B-type pixels are alternately arranged in a horizontal direction and a vertical direction, that is, in the first and second directions, and thus a vertical stripe or a horizontal stripe to be observed on the LCD can be prevented.

If the data voltage is applied to the first sub-pixel electrodes Pa of all the pixels through first data lines Da, that is, if a pixel array includes only the A-type pixels, and if the LCD is driven in a column inversion mode, then a vertical stripe that moves in a horizontal direction with respect to an inspection pattern, which moves in the horizontal direction by one pixel per frame, may be observed.

Further, if the data voltage is applied to the first sub-pixel electrodes Pa of one pixel row through the first data lines Da, and the data voltage is applied to the first sub-pixel electrodes Pa in the next pixel row through second data lines Db, that is, when A-type pixel rows and B-type pixel rows are alternately arranged, then it is possible to prevent the above-described vertical stripe moving in the horizontal direction from occurring. However, coupling between each of the first sub-pixel electrodes Pa and the first and second data lines Da and Db located on both sides of each of the first sub-pixel electrodes Pa occurs. Since coupling capacitances between each of the first sub-pixel electrodes Pa and the first and second data lines Da and Db vary depending on the A-type pixel and the B-type pixel, a horizontal stripe may be observed.

Therefore, like the LCD according to the first exemplary embodiment of the present invention, as shown in FIG. 1, as the A-type pixels and the B-type pixels are alternately arranged in the horizontal direction and the vertical direction, it is possible to prevent the above-described vertical stripe or the horizontal stripe that moves in the horizontal direction. However, when the LCD having such a structure operates at a low gray scale level, the liquid crystals are substantially affected by the first sub-pixel electrodes Pa to which a relatively higher voltage is applied. Therefore, the difference in coupling capacitance between the first sub-pixel electrodes Pa and the first data lines Da and between the first sub-pixel electrodes Pa and the second data lines Db is reduced to thereby prevent deterioration in display quality due to crosstalk.

Further, like the first exemplary embodiment of the present invention, as the first and second data lines Da and Db are disposed such that the second sub-pixel electrode Pb overlaps the first and second data lines Da and Db, and the second sub-pixel electrode Pb surrounds the first sub-pixel electrode Pa, it is possible to prevent the vertical stripe or the horizontal stripe from occurring even when the A-type pixels and the B-type pixels are not alternately disposed in the horizontal direction and the vertical direction. That is, the deterioration in display quality can be prevented by reducing the difference in coupling capacitance between the first and second data lines Da and Db and the first sub-pixel electrodes Pa. This will be further described below.

Hereinafter, referring to FIGS. 3A to 5, the exemplary LCD according to the first exemplary embodiment will be further described. The LCD according to this exemplary embodiment includes the lower display panel on which the TFT array is formed, the upper display panel that faces the lower display panel, and the liquid crystal layer interposed there between.

Figure 3B:
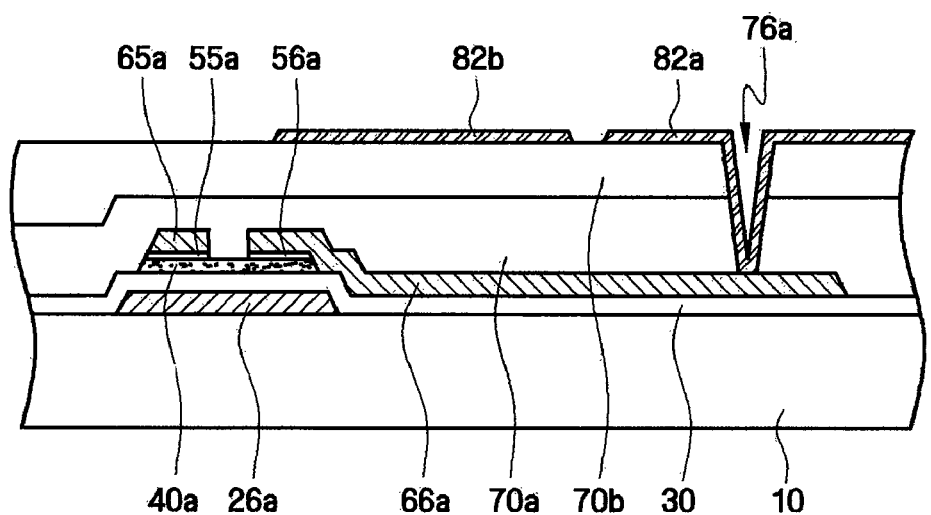
FIG. 3B is a cross-sectional view of the exemplary lower display panel taken along line IIIB-IIIB' of FIG. 3A.
Figure 3C:
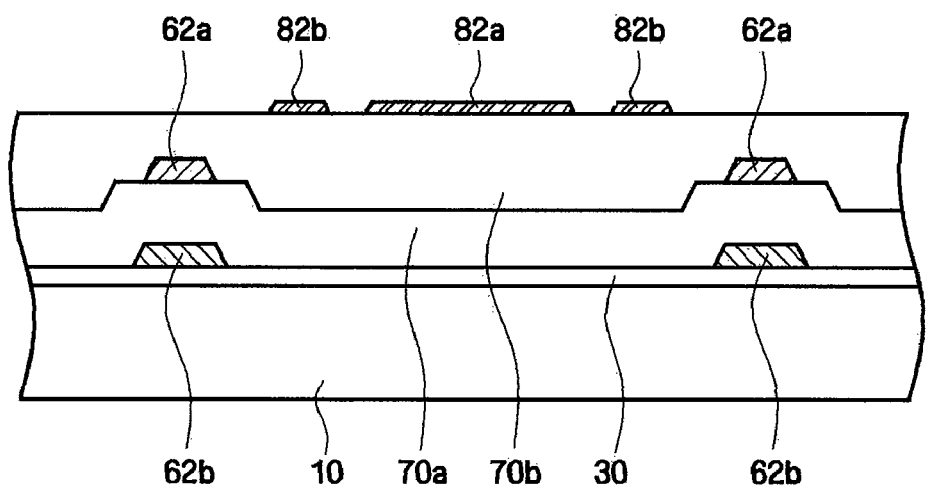
FIG. 3C is a cross-sectional view of the exemplary lower display panel taken along line IIIC-IIIC' of FIG. 3A.

First, referring to FIGS. 3A to 3C, the lower display panel of the LCD according to the first exemplary embodiment will be described. Here, FIG. 3A is a layout view of an exemplary lower display panel that includes an exemplary A-type pixel of FIG. 1 according to the exemplary embodiment of the present invention. FIG. 3B is a cross-sectional view of the exemplary lower display panel taken along line IIIB-IIIB' of FIG. 3A. FIG. 3C is a cross-sectional view of the exemplary lower display panel taken along line IIIC-IIIC' of FIG. 3A.

Gate lines 22 that extend substantially in the horizontal or first direction and transmit gate signals are formed on an insulating substrate 10 that may be formed of transparent glass or the like. Each of the gate lines 22 is allocated to one row of pixels. Further, a pair of first and second protruding gate electrodes 26a and 26b are formed on the gate line 22 for each pixel. The gate line 22 and the first and second gate electrodes 26a and 26b are referred to as gate wiring lines.

Further, a storage line 28 is formed on the insulating substrate 10. The storage line 28 crosses a pixel region, and substantially extends in the horizontal direction, and is thus at least substantially parallel with the gate line 22. A storage electrode 27 is connected to the storage line 28 and has a width that is larger than a width of the storage line 28. The storage electrode 27 and the pixel electrode 82 overlap each other to thereby form a storage capacitor that improves charge capacity of the pixel. The storage electrode 27 and the storage line 28 are referred to as storage wiring lines. In this embodiment, the storage wiring lines 27 and 28 overlap a center of the pixel region, but the present invention is not limited thereto. In alternative embodiments, the shape and arrangement of the storage wiring lines 27 and 28 can be modified in various ways. Further, when sufficient storage capacitance is generated by overlapping the pixel electrode 82 and the gate line 22, the storage wiring lines 27 and 28 need not be included.

The gate wiring lines 22, 26a, and 26b and the storage wiring lines 27 and 28 may be formed of an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum (Mo) or a molybdenum alloy, chromium (Cr), titanium (Ti), or tantalum (Ta). In addition, each of the gate wiring lines 22, 26a, and 26b and each of the storage wiring lines 27 and 28 may have a multilayer structure that includes two conductive films (not shown) having different physical properties. In such a multilayer structure, one conductive film of the two conductive films may be formed of a metal having low resistivity, for example, an aluminum-based metal, a silver-based metal, or a copper-based metal, so as to reduce a signal delay or voltage drop in each of the gate wiring lines 22, 26a, and 26b and each of the storage wiring lines 27 and 28. The other conductive film in a multilayer structure is formed of, in particular, a material having excellent contact characteristics such as indium tin oxide ("ITO"), indium zinc oxide ("IZO"), or other pixel electrode material, and the other conductive film may be for example, a molybdenum-based metal, chromium, titanium, or tantalum. Examples of such multilayer structures include a structure that has a lower chromium film and an upper aluminum film, and a structure that has a lower aluminum film and an upper molybdenum film. However, the present invention is not limited thereto, and each of the gate wiring lines 22, 26a, and 26b and each of the storage wiring lines 27 and 28 may be formed of various metallic materials or conductors other than the above materials.

A gate insulating layer 30 formed of a silicon nitride ($SiN_x$) or the like is formed on the gate lines 22 and the storage wiring lines 27 and 28, as well as on exposed surfaces of the insulating substrate 10.

Semiconductor layers 40a and 40b formed of hydrogenated amorphous silicon ("a-Si") or polysilicon are formed on the gate insulating layer 30. The semiconductor layers 40a and 40b may have various shapes, such as an island shape or a stripe shape. For example, as illustrated in FIG. 3A, the semiconductor layers 40a and 40b may be formed to have an island shape. The semiconductor layers 40a and 40b are formed to overlap the gate electrodes 26a and 26b.

Ohmic contact layers 55a and 56a are formed on the semiconductor layers 40a and 40b, and may be formed of silicide or n+ hydrogenated a-Si in which n-type impurities are doped at high concentration. A pair of ohmic contact layers 55a and 56a are located on each of the semiconductor layers 40a and 40b.

A pair of first and second data lines 62a and 62b, and a pair of first and second drain electrodes 66a and 66b, which correspond to the first and second data lines 62a and 62b, respectively, are formed on the ohmic contact layers 55a and 56a and the gate insulating layer 30.

The first and second data lines 62a and 62b extend substantially in a vertical direction, cross the gate lines 22 and the storage lines 28, and transmit data voltages. First and second source electrodes 65a and 65b that extend toward the first and second drain electrodes 66a and 66b, respectively, protrude from the first and second data lines 62a and 62b, respectively. As shown in FIG. 3A, one pixel is divided into a pair of sub-pixels, the first data line 62a transmits a data signal to one sub-pixel, and the second data line 62b transmits a different data signal to the other sub-pixel, as will be further described below.

The first and second data lines 62a and 62b, the first and second source electrodes 65a and 65b, and the first and second drain electrodes 66a and 66b are referred to as data wiring lines. The first data lines 62a are overlapped by the second data lines 62b and over the second data lines 62b. The first and second data lines 62a and 62b are insulated by the insulting layer interposed between the first and second data lines 62a and 62b overlapped by the second data lines 62b. Therefore, an aperture ratio of the LCD increase because when the first data wiring line overlaps the second data wiring line there is less area between pixel electrodes. Each of the data wiring lines 62a, 62b, 65a, 65b, 66a, and 66b may be preferably formed of a refractory metal, such as chromium, a molybdenum-based metal, tantalum, or titanium. Further, each of the data wiring lines 62a, 62b, 65a, 65b, 66a, and 66b may have a multilayer structure in which an upper layer (not shown) formed of a low-resistance material is formed on a lower layer (not shown) formed of a refractory metal or the like. Examples of the multilayer structure may include a three-layer structure that has a lower molybdenum layer, an intermediate aluminum layer, and an upper molybdenum layer, as well as the above-mentioned dual-layer structures that have a lower chromium layer and an upper aluminum layer, or that have a lower aluminum layer and an upper molybdenum layer. However, the present invention is not limited thereto, and each of the data wiring lines 62a, 62b, 65a, 65b, 66a, and 66b may be formed of various metallic materials or conductors other than the above materials.

The semiconductor layers 40a and 40b are at least partially overlapped by the first and second source electrodes 65a and 65b, respectively. As an example, the first source electrode 65a may be formed on the same layer as the data wiring lines 62a or the data wiring lines 62b. The first source electrode 65a is electrically connected to the data wiring lines 62a through third and forth contact holes 77c and 77d, respectively and the first source electrode 65a may be formed on same layer as the data wiring lines 62b.

The first and second drain electrodes 66a and 66b face the first and second source electrodes 65a and 65b, respectively, with respect to the gate electrodes 26a and 26b. The semiconductor layers 40a and 40b are at least partially overlapped by the first and second drain electrodes 66a and 66b, respectively. Here, the above-described ohmic contact layers 55a and 56a may exist between the semiconductor layers 40a and 40b and the first and second source electrodes 65a and 65b and between the semiconductor layers 40a and 40b and the first and second drain electrodes 66a and 66b to reduce contact resistance there between.

A passivation layer 70a is formed on the data wiring lines 62b, 65a, 65b, 66a, and 66b and the exposed semiconductor layers 40a and 40b, as well as on exposed portions of the gate insulating layer 30. A passivation layer 70b is formed on the data wiring lines 62a.

The passivation layers 70a and 70b are formed of an inorganic material, such as silicon nitride or silicon oxide, an organic material that has a good planarizing characteristic and photosensitivity, or an insulating material having a low dielectric constant, such as a-Si:C:O or a-Si:O:F, which is formed by plasma enhanced chemical vapor deposition ("PECVD"). In addition, the passivation layers 70a and 70b may have a dual-layer structure, which includes a lower inorganic layer and an upper organic layer, to improve characteristics of the organic film and protect the exposed semiconductor layers 40a and 40b. Further, a red, green or blue color filter layer may be used as the passivation layers 70a and 70b.

A pixel electrode 82 formed on the passivation layers 70a and 70b includes first and second sub-pixel electrodes 82a and 82b that are separated from each other. Here, each of the first and second sub-pixel electrodes 82a and 82b may be formed of a transparent electric conductor, such as ITO or IZO, or a reflective electric conductor, such as aluminum.

The first and second sub-pixel electrodes 82a and 82b are electrically connected to the first and second drain electrodes 66a and 66b through first and second contact holes 76a and 76b, respectively, and are applied with different data voltages from the first and second drain electrodes 66a and 66b.

The first and second sub-pixel electrodes 82a and 82b, to which the data voltages are applied, generate an electric field together with the common electrode on the upper display panel, thereby determining the arrangement of liquid crystal molecules in the liquid crystal layer between the first and second sub-pixel electrodes 82a and 82b and the common electrode.

Further, as described above, referring to FIGS. 2 and 3A, the sub-pixel electrodes 82a and 82b, and the common electrode form the liquid crystal capacitors Clca and Clcb, respectively, thereby maintaining the applied voltages even after the TFTs Qa and Qb are turned off. In order to increase the voltage maintaining capacity, the storage capacitors Csta and Cstb connected in parallel with the liquid crystal capacitors Clca and Clcb may be formed in such a way that the first and second sub-pixel electrodes 82a and 82b or the first and second drain electrodes 66a and 66b connected to the first and second sub-pixel electrodes 82a and 82b overlap the storage wiring lines 27 and 28.

Returning to FIGS. 3A to 3C, one pixel electrode 82 includes the first and second sub-pixel electrodes 82a and 82b that are electrically separated from each other by a gap 83. The first sub-pixel electrode 82a has an approximate horizontal V-shape, such as a rotated and truncated V-shape. The second sub-pixel electrode 82b is formed in a region of the pixel that excludes the first sub-pixel electrode 82a and the gap 83. Specifically, the second sub-pixel electrode 82b is formed to surround the periphery of the first sub-pixel electrode 82a.

The gap 83 includes inclined portions that are inclined with respect to the gate line 22 by approximately 45° or −45°, and vertical parts portions that connect between the inclined parts portions and are arranged along the first and second data lines 62a and 62b.

Figure 4:
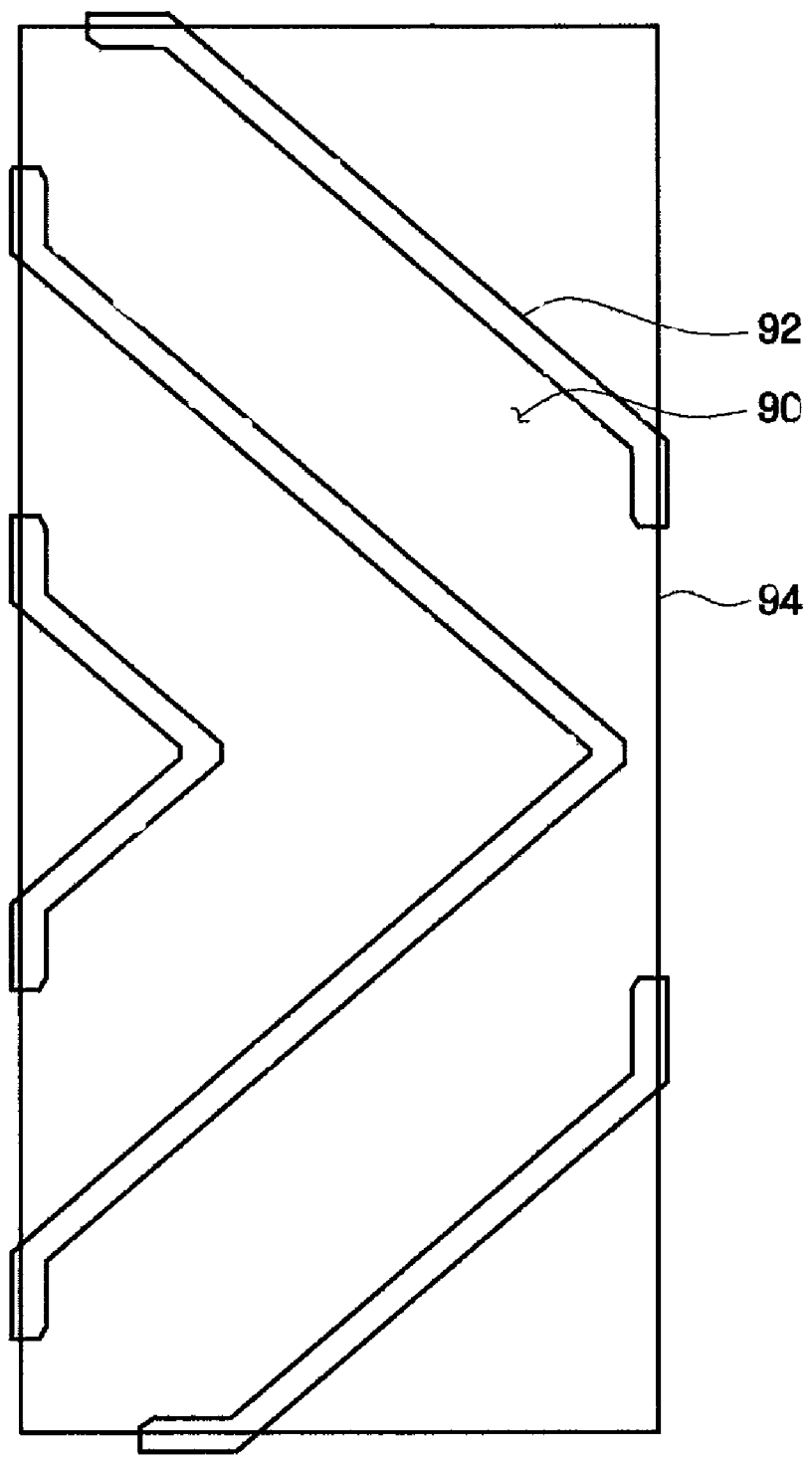
FIG. 4 is a layout view of an exemplary upper display panel that is coupled to the exemplary lower display panel of FIG. 3A.

Though not shown in the drawings, domain dividing means, such as cut outs or protrusions (not shown), may be formed so that they are inclined with respect to the gate line 22 by approximately 45° or −45°. A display region of the pixel electrode 82 is divided into a plurality of domains along directions in which the main directors of the liquid crystal molecules included in the liquid crystal layer are arrayed when an electric field is applied. The gap 83 and the domain dividing means serve to divide the pixel electrode 82 into many domains. Here, a domain refers to a region where liquid crystal molecules are formed while the liquid crystal molecules are collectively inclined or tilted in a predetermined direction by an electric field formed between the pixel electrode 82 and the common electrode 90, as shown in FIG. 4.

As described above, the entire first sub-pixel electrode 82a has a V-shape, and the second sub-pixel electrode 82b is formed to surround the first sub-pixel electrode 82a. Specifically, the second sub-pixel electrode 82b includes main regions and bridge regions. The main regions are adjacent to the inclined portions of the gap 83, which are inclined with respect to the gate line 22 by approximately 45° or −45°, and control the movements of the liquid crystal molecules. The bridge regions are adjacent to the vertical portions of the gap 83, are arranged along the first and second data lines 62a and 62b, and connect the main regions to each other.

An alignment layer (not shown) may be coated on the first and second sub-pixel electrodes 82a and 82b and the passivation layer 70.

Figure 5:
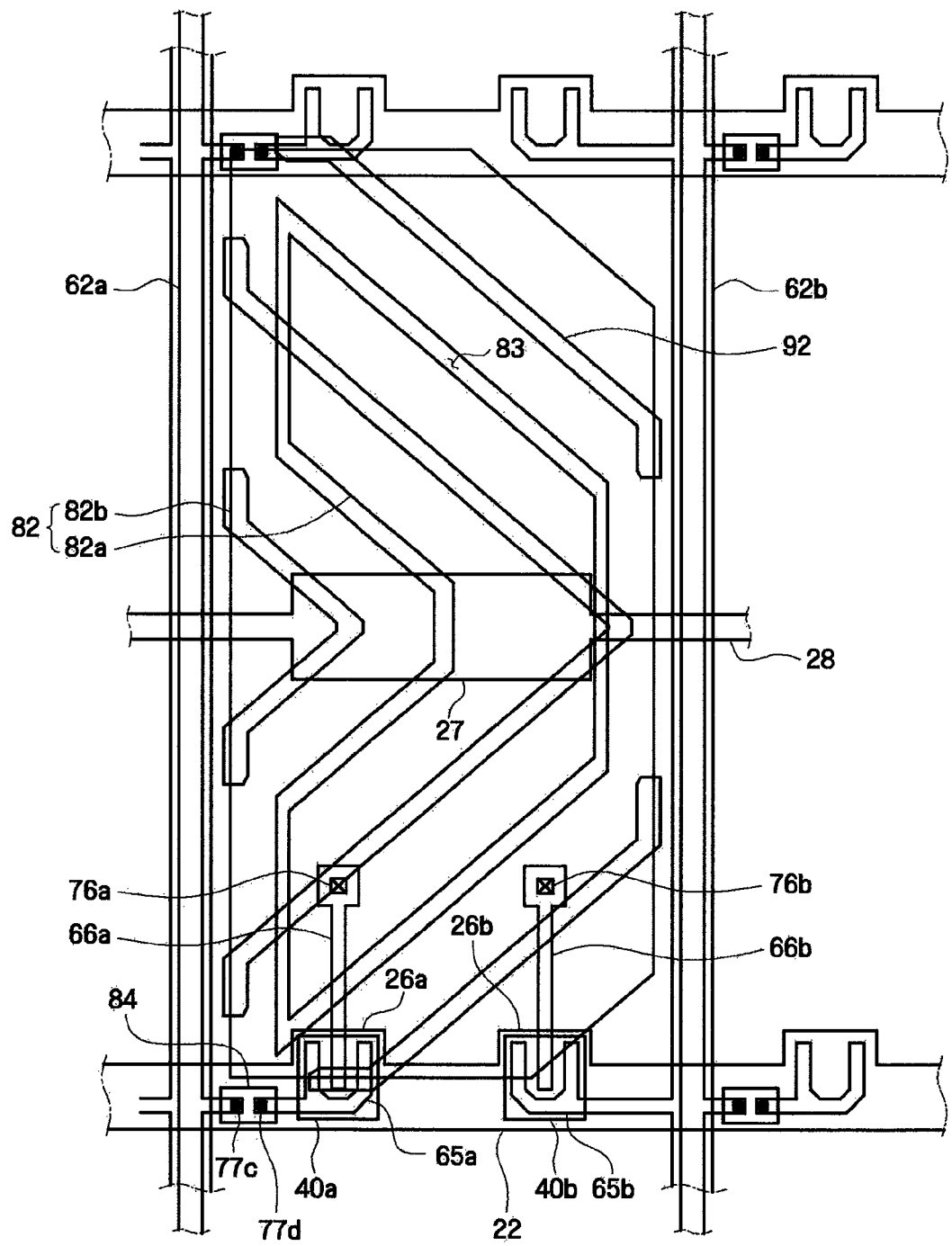
FIG. 5 is a layout view of an exemplary LCD that includes the exemplary lower display panel of FIG. 3A and the exemplary upper display panel of FIG. 4.

Next, referring to FIGS. 4 and 5, the exemplary upper display panel and the exemplary LCD will be described. Here, FIG. 4 is a layout view of an exemplary upper display panel that is coupled to the exemplary lower display panel of FIG. 3A. FIG. 5 is a layout view of an exemplary LCD that includes the exemplary lower display panel of FIG. 3A and the exemplary upper display panel of FIG. 4.

A black matrix 94 that prevents light leakage and defines pixel regions is formed on an insulating substrate (not shown) that is formed of transparent glass or the like. The black matrix 94 may be formed on portions corresponding to the gate line 22 and the first and second data lines 62a and 62b, and a portion corresponding to the TFT. Further, the black matrix 94 may have various shapes so as to block light leakage around the first and second sub-pixel electrodes 82a and 82b and the TFT. The black matrix 94 may be formed of a metal (metal oxide), such as chromium or chromium oxide, or an organic black resist.

Red, green, and blue color filters (not shown) may be sequentially arranged in the pixel regions in the black matrix 94.

An overcoat layer (not shown) may be formed on the color filters so as to remove a step between the color filters.

The common electrode 90 that is formed of a transparent conductive material, such as ITO or IZO, is formed on the overcoat layer. The common electrode 90 may include domain dividing means 92 that face the first and second sub-pixel electrodes 82a and 82b and are inclined with respect to the gate line 22 by approximately 45° or −45°, and may include cutouts or protrusions.

An alignment layer (not shown) that aligns the liquid crystal molecules may be formed on the common electrode 90.

The lower display panel and the upper display panel having the above-described structures are aligned and coupled to each other, and liquid crystal materials are injected there between and perpendicularly aligned. In this way, a basic structure of the LCD according to the first exemplary embodiment is formed.

In a state where an electric field is not applied to the pixel electrode 82 and the common electrode 90, the liquid crystal molecules included in the liquid crystal layer are aligned such that the directors thereof are perpendicular to the lower display panel and the upper display panel. Further, the liquid crystal molecules have negative dielectric anisotropy.

The LCD may further include components, such as polarizers and backlights, in addition to the above-mentioned basic structure. Here, the polarizers may be respectively provided on both sides of the basic structure so that one of the transmission axes of the polarizers is in parallel with the gate line 22 and the other transmission axis is orthogonal to the gate line 22.

When an electric field is applied between the lower display panel and the upper display panel, an electric field perpendicular to the upper and lower display panels is generated in almost all the regions. However, a horizontal electric field is generated around the gap 83 of the pixel electrode 82 and the domain dividing means 92 of the common electrode 90. The horizontal electric field helps align the liquid crystal molecules in each of the domains.

Since the liquid crystal molecules of this embodiment have a negative dielectric anisotropy, when an electric field is applied to the liquid crystal molecules, the liquid crystal molecules in each of the domains are tilted to be orthogonal to the gap 83 or the domain dividing means 92 that divide the domains. Therefore, the liquid crystal molecules are titled in different directions on both sides of the gap 83 or the domain dividing means 92, and the inclined portions of the gap 83 or the inclined portions of the domain dividing means 92 are symmetrical with respect to the center of each pixel. As a result, the liquid crystal molecules are tilted in four directions with respect to the gate line 22 by about 45° or −45°. Since optical characteristics are compensated with each other due to the liquid crystal molecules that are tilted in four directions, a viewing angle is increased.

Hereinafter, referring to FIGS. 3A to 5, the operation of the exemplary LCD according to the first exemplary embodiment of the present invention will be described.

In the A-type pixel, a relatively higher data voltage is applied to the first sub-pixel electrode 82a that is connected to the first data line 62a, and a relatively lower data voltage is applied to the second sub-pixel electrode 82b that is connected to the second data line 62b. Accordingly, it is possible to improve side visibility of the LCD.

In particular, when the LCD operates at a low gray scale level, liquid crystals for the most part are influenced by the first sub-pixel electrodes 82a to which the relatively higher data voltage is applied, and a voltage is not applied to the second sub-pixel electrodes 82b. In this case, since the second sub-pixel electrode 82b is substantially applied with the same voltage as the common electrode 90 on the upper display panel, the liquid crystal molecules disposed above the second sub-pixel electrode 82b are aligned such that the directors thereof are perpendicular to the lower display panel. Therefore, light emitted from the backlight cannot pass through the second sub-pixel electrode 82b but is blocked.

FIG. 6 is a block diagram illustrating an exemplary LCD, to which an exemplary lower display panel shown in FIG. 1 is applied. For simplification, data line pairs connected to each of the pixel electrodes PX are shown as straight lines. However, as shown in FIGS. 1 and 3A, each of the data line pairs may be wired in a zigzag shape, and each of the pixel electrodes PX overlap the data line pairs.

An LCD 300 shown in FIG. 6 includes a liquid crystal panel 310, a timing controller 320, a gray voltage generator 330, a data driver 340, and a gate driver 350. While the liquid crystal panel 310 is utilized in the LCD 300 shown in FIG. 6, the remaining elements of the LCD 300 may be adapted for use with liquid crystal panels containing lower display panels of any of the previously described embodiments.

The liquid crystal panel 310 may include the lower display panel 210 of FIG. 1 and an upper display panel (not shown) facing the lower display panel 210.

The timing controller 320 controls image data signals R, G, and B according to a timing that is required by the data driver 340 and the gate driver 350, and outputs the controlled image data signals R, G, and B. Further, the timing controller 320 outputs first and second control signals CNTL1 and CNTL2 that control the data driver 340 and the gate driver 350. Examples of the first control signal CNTL1 may include a horizontal synchronization start signal STH, a data output signal TP, and the like. Examples of the second control signal CNTL2 may include a scan start signal STV, a gate clock signal CPV, an output enable signal OE, and the like.

The gray voltage generator 330 generates a plurality of gray voltages related to transmittance of the pixel electrode PX, and supplies the generated gray voltages to the data driver 340 as described below.

The data driver 340 drives data line pairs Da1/Db2, Da3/Db4 to Dam−1/Dbm of the liquid crystal panel 310 in response to the first control signal CNTL1 that is applied from the timing controller 320, and the gray voltages that are applied from the gray voltage generator 330.

The data driver 340 receives the first control signal CNTL1 and image signals DAT with respect to one pixel row from the timing controller 320, and selects a gray voltage corresponding to each of the image signals DAT among the gray voltages generated by the gray voltage generator 330. Then, after the data driver 340 converts the selected gray voltage into a corresponding data voltage, the data driver 340 applies the data voltage to corresponding data line pairs Da1/Db2, Da3/Db4 to Dam−1/Dbm. As described above, data voltages that have phase differences opposite to each other and voltages of different levels are applied to the data line pairs.

The gate driver 350 drives gate lines GL1 to GLn of the liquid crystal panel 310 in response to the second control signal CNTL2 input from the timing controller 320 and a gate on voltage VON and a gate off voltage VOFF that are output from a driving voltage generator (not shown). The gate driver 350 applies gate voltages to the pixel electrodes PX through the gate lines GL1 to GLn, respectively, and "turns on or off" the first and second TFTs (Qa1 and Qb of FIG. 2) that are connected to each of the pixel electrodes PX.

Figure 7:
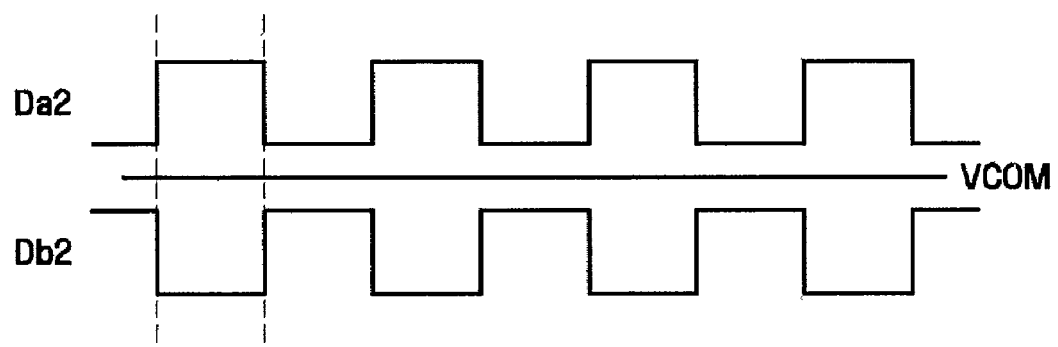
FIG. 7 is a waveform chart of a data voltage that is applied to each exemplary pixel electrode in order to implement an image pattern including a white pattern and a gray pattern.

FIG. 7 is a waveform chart of a data voltage that is applied to each exemplary pixel electrode in order to implement an image pattern including a white pattern and a gray pattern.

Referring to FIG. 7, a voltage waveform of the data line Da3 is a waveform of a voltage that is applied to the first sub-pixel electrode (PXa of FIG. 2) from the data driver 340, and a voltage waveform of the data line Db3 is a waveform of a voltage that is applied to the second sub-pixel electrode (PXb of FIG. 2) from the data driver 340.

As shown in FIGS. 1 and 2, it is preferable that the voltage waveforms of the data lines Da3 and Db3 have phases opposite to each other and swing in order to allow adjacent data line pairs Da3/Db3 to offset a coupling effect on the pixel electrode PX1.

As described above, according to the LCD of the exemplary embodiments of the present invention, it is possible to increase an aperture ratio.

Further, it is possible to increase visibility of the LCD and achieve a high aperture ratio.

Although the present disclosure of invention has been described in connection with the exemplary embodiments provided herein, it will be apparent to those skilled in the art in view of the foregoing that various modifications and changes may be made thereto without departing from the scope and spirit of the present teachings. Therefore, it should be understood that the above exemplary embodiments are not limitative, but illustrative in all aspects.

What is claimed is:

1. A liquid crystal display comprising:
a first insulating substrate;
gate wiring lines formed on the first insulating substrate and extending in a first direction;
first and second data wiring lines insulated from each other and insulatively crossing the gate wiring lines, the data wiring lines extending in a second direction different from the first direction; and
a plurality of pixel units each having a respective pixel electrode, where each pixel electrode includes first and second sub-pixel electrodes respectively coupled to receive from the first and second data wiring lines respectively different data voltages that can be simultaneously supplied to the first and second sub-pixel electrodes from the first and second data wiring lines, respectively,
wherein at least a part of a first of the data wiring lines overlaps a second of the data wiring lines, such that area consumed for supplying the different data voltages by way of respective ones of the first and second data wiring lines is less than what would be consumed if the overlapping ones of the first and second data wiring lines were not at least partially overlapping.

2. The liquid crystal display of claim 1, wherein an insulting layer is interposed between the overlapping parts of respectively overlapping ones of the first data wiring lines and the second data wiring lines.

3. The liquid crystal display of claim 2, wherein the insulting layer comprises a silicon nitride (SiNx) or an organic material.

4. The liquid crystal display of claim 3, further comprising:
a second insulating substrate facing the first insulating substrate;
a common electrode formed on the second insulating substrate; and
a liquid crystal layer interposed between the first and second insulating substrates, and the liquid crystal layer including liquid crystal molecules.

5. The liquid crystal display of claim 4, further comprising:
storage lines and storage electrodes formed over the first insulating substrate, the storage lines substantially extending in parallel with the gate wiring lines.

6. The liquid crystal display of claim 5, wherein respective widths of the first and second data wiring lines are different.

7. The liquid crystal display of claim 6, wherein pixel electrodes do not overlap the data wiring lines.

8. The liquid crystal display of claim 1, wherein, for each pixel electrode, the second sub-pixel electrode is formed to surround the first sub-pixel electrode.

9. The liquid crystal display of claim 1, wherein the pixel units include first-type pixels and second type pixels alternately arranged in the first and second directions and where, in the first-type pixels, each first sub-pixel electrode is configured to receive a data voltage from a first data wiring line, and where, in the second-type pixels, each first sub-pixel electrode is configured to receive a data voltage from a second data wiring line.

10. An image display system comprising:
a first insulative substrate having disposed thereon a first plurality of gate lines extending in a first direction, a second plurality of first data lines extending in a different second direction, and a third plurality of second data lines extending in the second direction, where the first and second data lines are electrically insulated from one another and where the first and second data lines insulatively cross with the gate lines to thereby define a plurality of individually controllable pixel regions, the data lines extending adjacent to associated ones of the pixel regions;
wherein each pixel region comprises a corresponding pixel unit having first and second subpixels provided therein, the first subpixel including a corresponding first switching element configured to control a light controlling attribute of the first subpixel and the second subpixel including a corresponding first switching element configured to control a light controlling attribute of the second subpixel;
where, for each pixel unit, one of the first and second switching elements is coupled to one of the first and second data lines and the other of the first and second switching elements is coupled to the other of the first and second data lines; and
where paired ones of the first and second data lines overlap in locations where they extend adjacent to associated ones of the pixel regions.

11. The image display system of claim 10 wherein the first and second switching elements of each pixel unit are coupled to an associated gate line extending adjacent to the pixel region of the pixel unit.

12. The image display system of claim 11 wherein the each pixel unit is a liquid crystal display unit and the first and second switching elements of each pixel unit are coupled to respective first and second subpixel electrodes.

13. The image display system of claim 10 and further comprising:
a data driver coupled to the first and second data lines and configured to apply different first and second data voltages to the subpixels of a given one of the pixel units by way of one and the other of the first and second data lines.

14. The image display system of claim 13 wherein the different first and second data voltages applied to a given one of the pixel units by the data driver can be of opposed polarities relative to a predetermined common voltage.

15. The image display system of claim 13 wherein the overlapping, paired and respective ones of the first and second data lines respectively couple to opposed pixel units disposed adjacent to opposed sides of the overlapping and paired first and second data lines that extend between the opposed pixel units.

* * * * *